Feb. 9, 1932.                J. G. JONES                1,844,715
                      MOTION PICTURE AND SOUND FILM
                          Filed April 22, 1929

INVENTOR
JOHN G. JONES
BY
N. M. Perrins
ATTORNEY

Patented Feb. 9, 1932

1,844,715

UNITED STATES PATENT OFFICE

JOHN G. JONES, OF ROCHESTER, NEW YORK, ASSIGNOR TO EASTMAN KODAK COMPANY, OF ROCHESTER, NEW YORK, A CORPORATION OF NEW YORK

MOTION PICTURE AND SOUND FILM

Application filed April 22, 1929. Serial No. 357,022.

This invention relates to motion picture film with a sound record thereon and the method of marking the same.

According to the present procedure of preparing motion picture film with a sound record thereon, the sound accompaniment for any portion of the picture is not carried on the same frame as the picture since the picture is projected intermittently while the sound record is continuously reproduced. Furthermore in the making of such motion pictures it is now the practice to prepare a negative of the picture and a separate negative of the sound record. The picture negative and the sound negative are then combined on a positive film by first transferring the images from the picture negative to the positive by an intermittent printer and then transferring the sound record from the sound negative to the sound record portion of the positive by a continuous printer. The order of performing these steps is not fixed but may be reversed. It therefore becomes important that there be a visible or other distinctive mark at the beginning of the motion picture areas so that the picture negative and sound negative may be started on the proper part of the positive film to synchronize the picture and sound accompaniment properly. Furthermore, in the use of such films it is frequently necessary to cut out sections of the film for necessary repairs or other purposes so that it is essential that the motion picture areas be properly marked.

In accordance with one feature of the present invention it is proposed to place a distinctive marking such as perforations or indentations on the initial exposure area of the strip and to provide each motion picture exposure area with a designation of a consecutive series of designations. A further feature of the invention comprises a negative, a stencil or other similar article by which the consecutive series of numbers may be readily applied to the margin of the film opposite each exposure area.

Figures 1, 2:
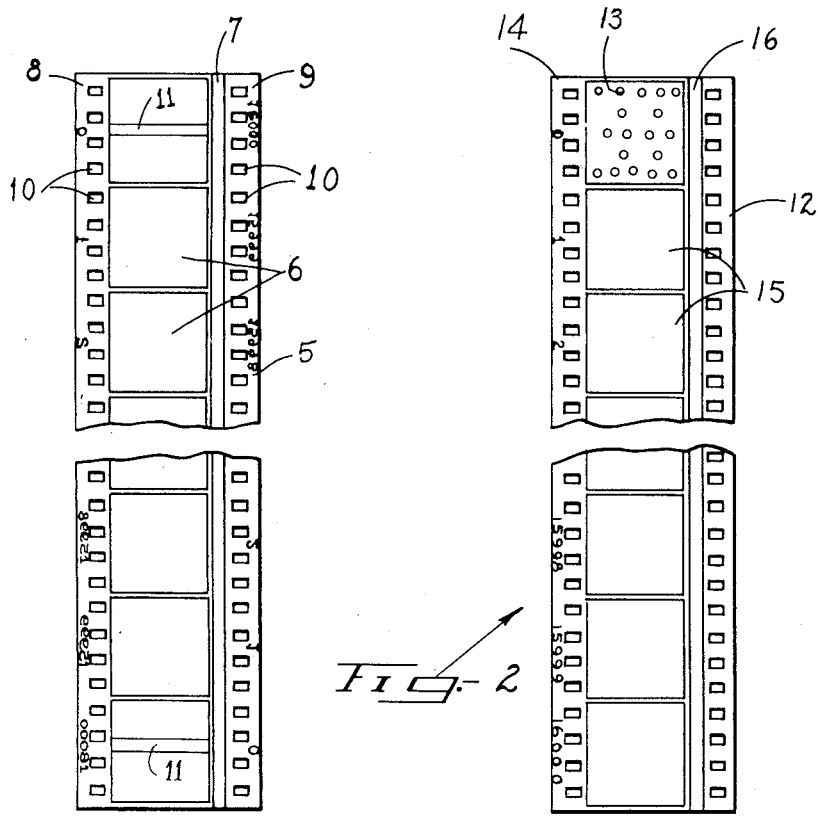
Figure 3:
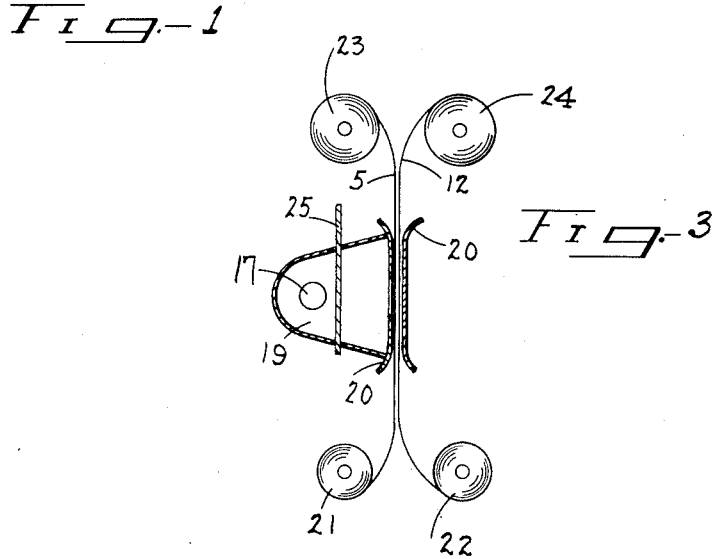

These and other features will appear from the detailed description and claims when taken with the drawings in which Fig. 1 is a negative or other suitable stencil for consecutively numbering the frames or exposure areas of a strip of motion picture film; Fig. 2 is a section of positive film with a suitable designation on the initial exposure area of the series and with the several exposure areas consecutively marked by a series of numbers in the form of latent images while Fig. 3 is a schematic showing of a suitable apparatus by which the film of Fig. 2 may be marked.

Referring to Fig. 1 there is shown a strip of motion picture film generally designated 5 provided with perforations 10 and having a series of motion picture exposure areas 6 and a sound record area 7. On the left hand margin 8 of this strip of film there is shown an ascending series of consecutive numbers with one number opposite each exposure area 6 while the right hand margin 9 of this strip is provided with a series of descending numbers. The entire area of the negative 5 except the two series of numbers on the margins 8 and 9 is opaque while the numbers themselves are left transparent. It will be understood that instead of using a negative film a stencil of the dimensions of film 5 and having perforations 10, of any suitable opaque flexible material may be used in which case the numerals on the margin may be cut out so that light will pass therethrough. The #0 exposure areas of the strip 5 may have a piece of paper 11 applied thereto at their median portions.

The negative or stencil 5 just described may be utilized to prepare the positive film generally designated 12 shown in Fig. 2 and having the same general dimensions as the negative film. The #0 frame 13 of this positive film may be indented or perforated to give a suitable indication of the boundary of this exposure area. These perforations may include a series which may be placed in registry with the strip 11 on the film 5. When thus placed in registry the negative film 5 and the positive film 12 are passed through any suitable form of printer such as that schematically shown in Fig. 3. This printer is so constructed that the descending series of numberings, for example, as shown in Fig. 1 the numberings on the margin 9, are rendered ineffective and as the negative 5 and the positive 12 advance through the printer the series of numerals on the margin 8 of the negative are transferred as latent images on the margin 14 of the positive film. The remainder of this positive film, including the motion picture exposure areas 15 and the sound record portion 16, are left unexposed.

The printer includes a source of light 17, a lamp house 19 a shutter 25 and the gate elements 20, 20. As it well-known the printer also includes mechanism (not shown) for simultaneously advancing the negative 5 and the positive 12 from the reels 21 and 22 to take-up reels 23 and 24. The purpose of providing an ascending and descending series of numberings on the two margins of the negative 5 is to obviate the necessity of rewinding the negative before it can be used in preparing a second positive. In the arrangement provided the series of numerals on the margin 8 is first used and when the negative has been wound on the reel the series of numerals on the margin 9 is next used. In this way there is no necessity of rewinding the negative after each operation.

In the foregoing description it will be seen that the positive 12 has its initial frame marked with a suitable designation which is visible or distinguishable by touch while each of the exposure areas is marked with a numeral or a consecutive series of numbers preferably in the form of latent images. In this way, when the latent images are developed, a ready means is provided for indicating what portion of a reel of motion picture film has been cut out while the designation on the initial frame of the film is especially useful in producing synchronization between the motion picture portion of the film and the sound record.

What I claim is:

1. A motion picture film having a series of motion picture exposure areas and a longitudinally extending sound record portion arranged in parallel relation, said exposure areas being consecutively numbered with a numeral in the form of a latent image opposite each area and a starting mark perceptible by sight and touch indicating the beginning of the series of exposure areas.

2. An article for use in printing consecutive numbers opposite each frame of a motion picture film having a sound record thereon comprising a flexible support having separate ascending and descending series of consecutive numbers near the respective edge, the numbers of each series being spaced apart a distance corresponding to the length of each frame and having at the beginning end of each series a starting mark perceptible by sight and touch.

3. A sensitive motion picture film of standard dimensions having uniformly spaced standard perforations by which successive exposure areas of standard size are determined, and carrying along one border latent images of a series of consecutive numerals, there being one numeral image opposite the corresponding point of each exposure area, and the film being otherwise unexposed, and carrying also a mark perceptible to the senses of sight and touch and indicating the starting point of the series of latent images.

Signed at Rochester, New York, this 17th day of April, 1929.

JOHN G. JONES.